Figure 1:
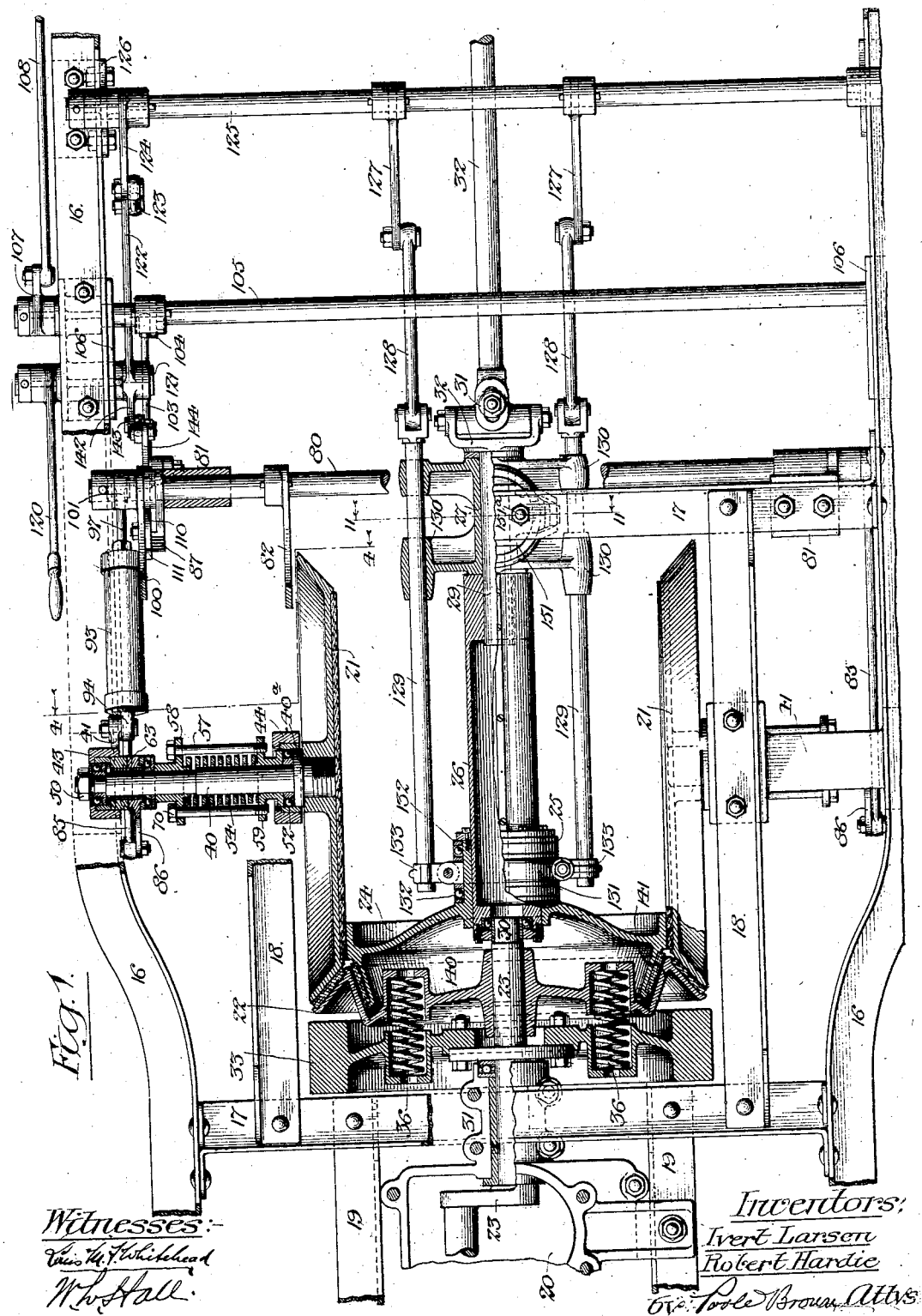

No. 823,178. PATENTED JUNE 12, 1906.
I. LARSEN & R. HARDIE.
FRICTIONAL POWER TRANSMISSION MECHANISM.
APPLICATION FILED NOV. 17, 1905.

6 SHEETS—SHEET 1.

Witnesses:

Inventors:
Ivert Larsen
Robert Hardie

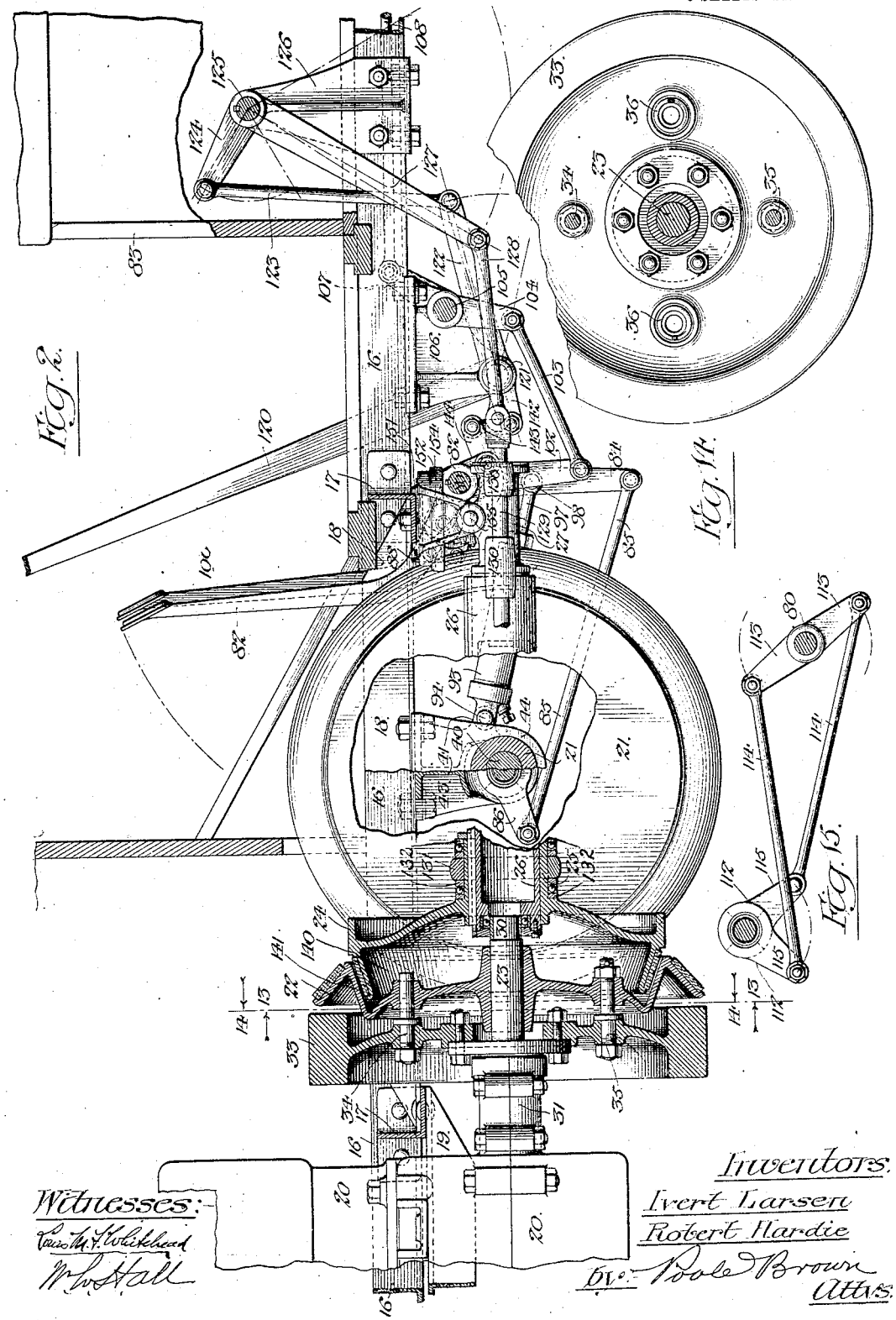

No. 823,178. PATENTED JUNE 12, 1906.
I. LARSEN & R. HARDIE.
FRICTIONAL POWER TRANSMISSION MECHANISM.
APPLICATION FILED NOV. 17, 1905.
6 SHEETS—SHEET 3.
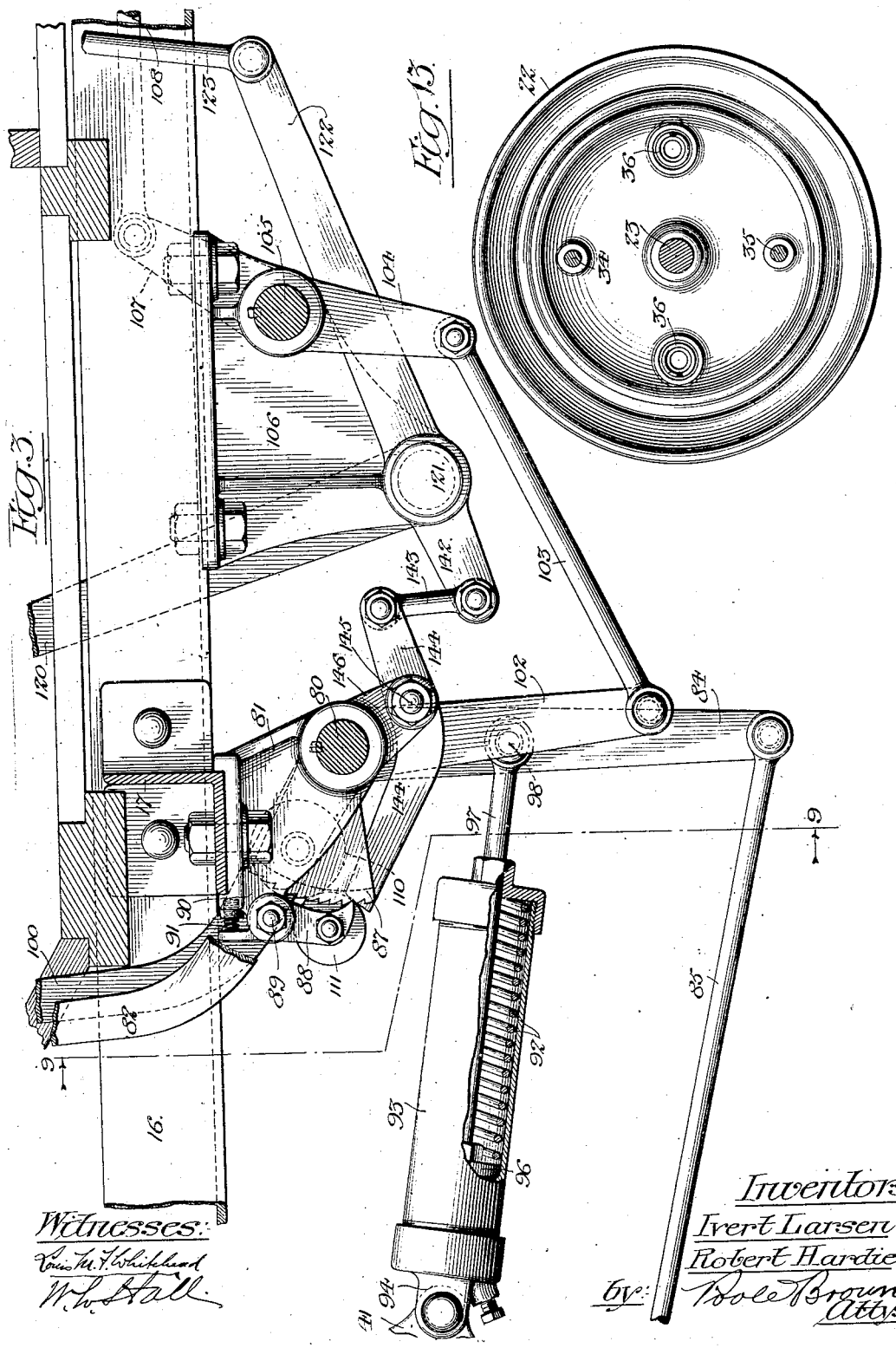
Witnesses:
Inventors.
Ivert Larsen
Robert Hardie
by Dole Brown
Attys.

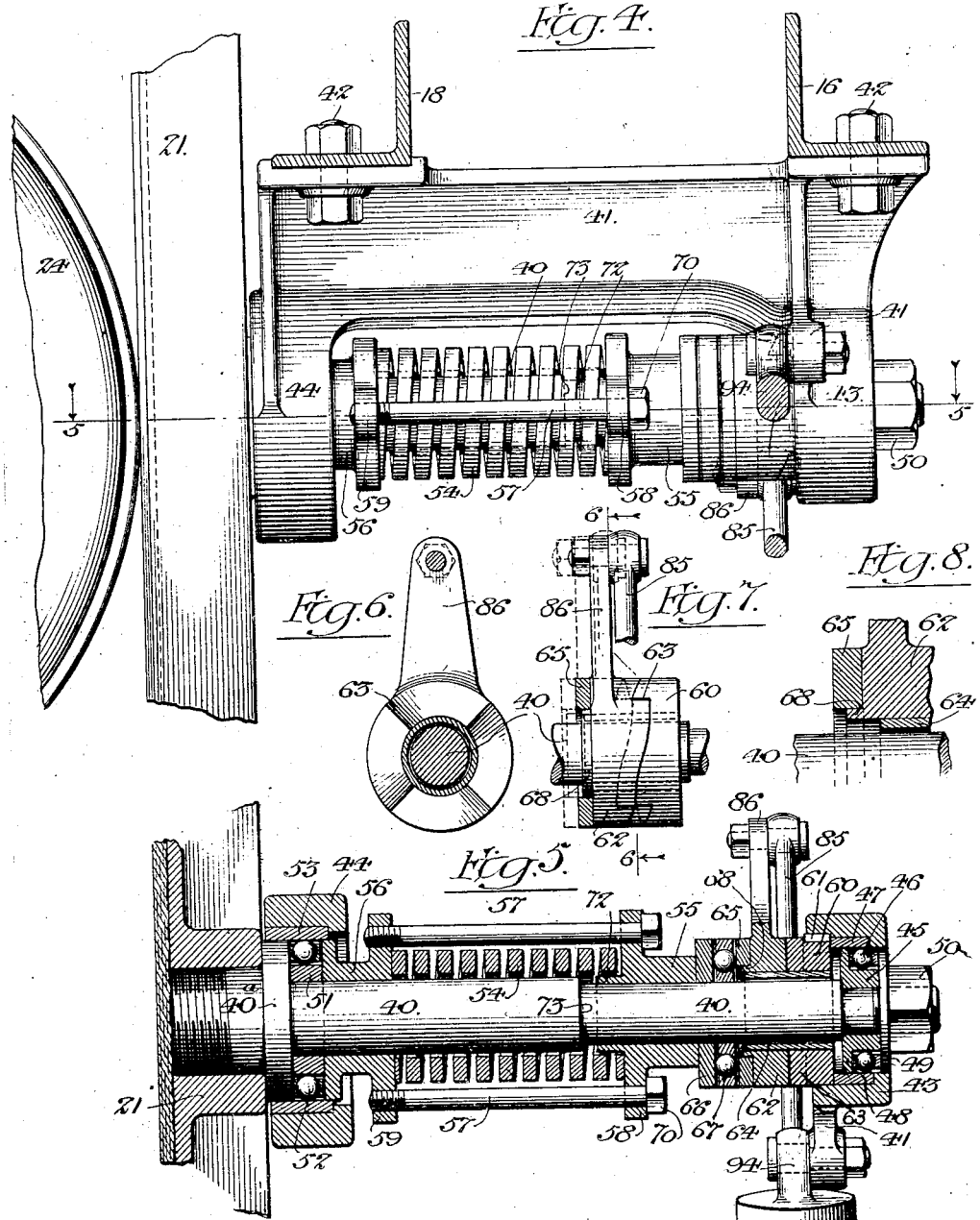

No. 823,178. PATENTED JUNE 12, 1906.
I. LARSEN & R. HARDIE.
FRICTIONAL POWER TRANSMISSION MECHANISM.
APPLICATION FILED NOV. 17, 1905.
6 SHEETS—SHEET 5.
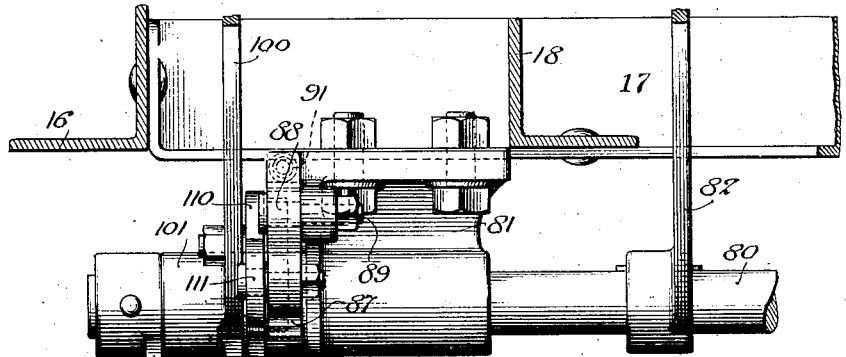
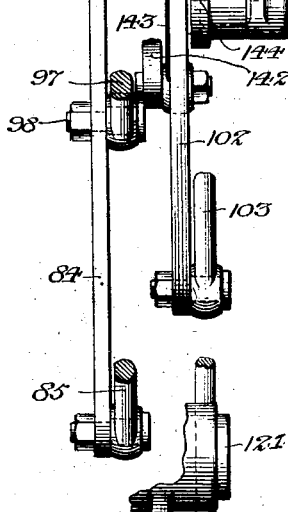
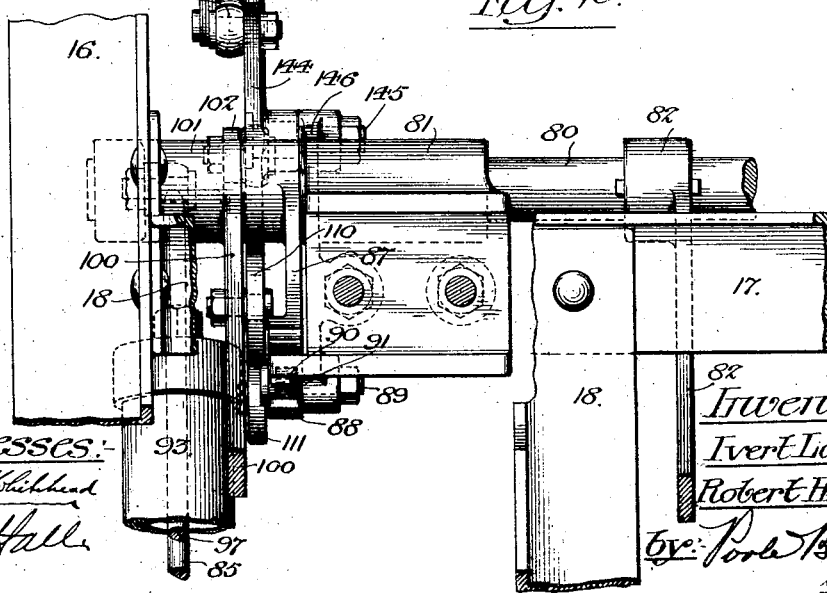

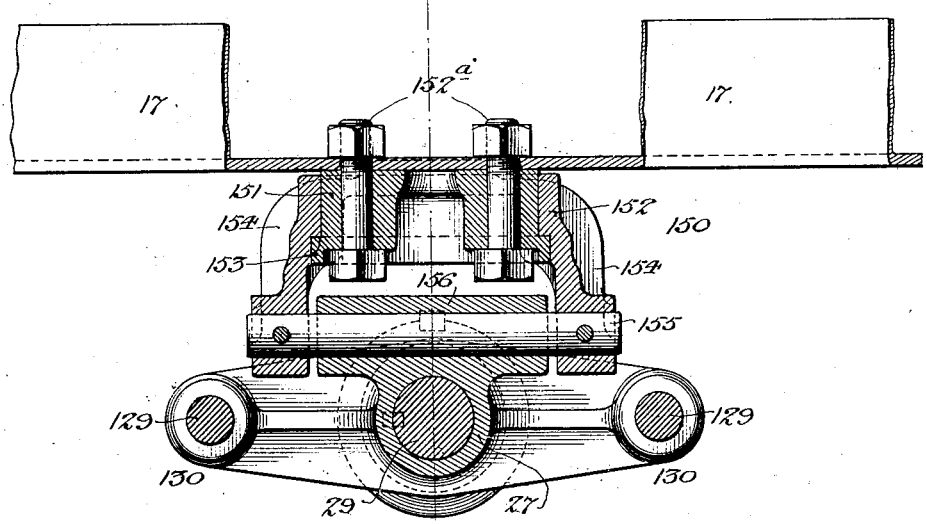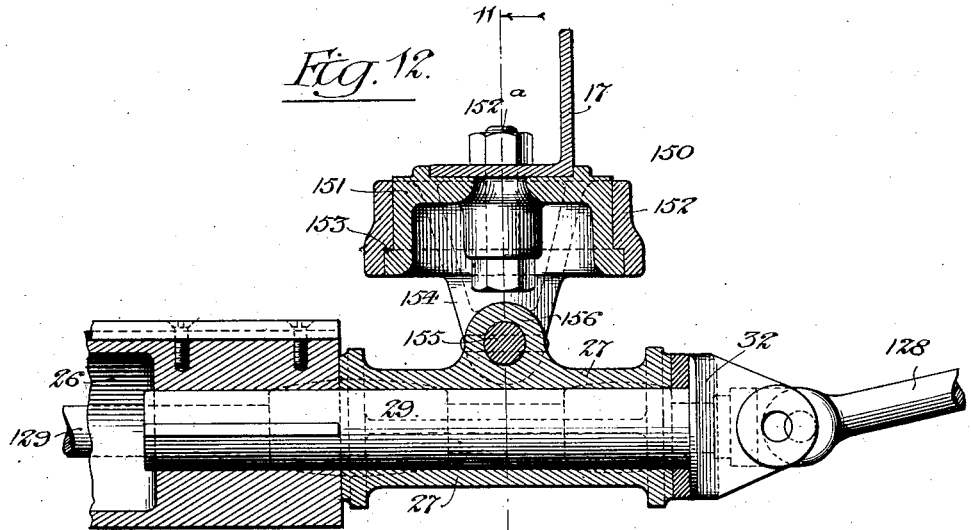

UNITED STATES PATENT OFFICE.

IVERT LARSEN AND ROBERT HARDIE, OF CHICAGO, ILLINOIS.

FRICTIONAL POWER-TRANSMISSION MECHANISM.

No. 823,178. Specification of Letters Patent. Patented June 12, 1906.

Application filed November 17, 1905. Serial No. 287,792.

*To all whom it may concern:*

Be it known that we, IVERT LARSEN and ROBERT HARDIE, of Chicago, in the county of Cook and State of Illinois, have invented certain new and useful Improvements in Frictional Power-Transmission Mechanism; and we do hereby declare that the following is a full, clear, and exact description thereof, reference being had to the accompanying drawings, and to the numerals of reference marked thereon, which form a part of this specification.

This invention relates to improvements in frictional power-transmission devices of the general character shown in our prior United States Letters Patent, No. 776,027, granted November 29, 1904; and the invention consists in the matters hereinafter set forth, and more particularly pointed out in the appended claims.

Among the objects of the invention are to improve the construction of transmission mechanisms of the general type referred to, to increase the efficiency, durability, and usefulness thereof, and to render the same capable of easy and ready operation and control. This type of friction mechanism lends itself with peculiar adaptability to use in motor-driven vehicle construction, and we have herein shown, as one example of the adaptation of the invention, its use in a motor-driven vehicle construction.

As shown in the drawings, Figure 1 is a partial top plan and partial horizontal sectional view of a frictional transmission mechanism embodying our invention. Fig. 2 is a partial side elevation and partial vertical section of said parts. Fig. 3 is an enlarged partial view of the mechanism for operating the friction devices. Fig. 4 is an enlarged view taken on the indirect line 4 4 of Fig. 1. Fig. 5 is a longitudinal section taken on line 5 5 of Fig. 4. Figs. 6, 7, and 8 are details of one of the cams constituting part of the means for bringing the frictional elements of the mechanism into operative engagement. Fig. 9 is a view, partially in section and partially in elevation, taken on the indirect line 9 9 of Fig. 3. Fig. 10 is a horizontal view of the parts shown in Fig. 9. Fig. 11 is a detail cross-section taken on line 11 11 of Figs. 1 and 12. Fig. 12 is a vertical section taken on line 12 12 of Fig. 11. Fig. 13 is a section taken on line 13 13 of Fig. 2 looking in the direction indicated by one pair of the arrows. Fig. 14 is a view taken on the same line looking in the opposite direction. Fig. 15 is a modification of means for operating the cams for pressing the friction elements of the mechanism into operative engagement.

As shown in the drawings, 16 16 designate the side members of the body-frame of a motor-driven vehicle connected at the front of the frame by transverse connecting-bars 17 17.

18 18 designate horizontal longitudinal bars inside of the frame-bars and attached at their ends with the transverse bars 17 and on which portions of the transmission mechanism are supported, as will hereinafter appear.

19 19 designate frame members which support the motor frame or casing 20.

The friction elements of the transmission mechanism herein shown are generally like those illustrated in our prior patent referred to and include two opposing indirect-drive friction-disks 21 21, which rotate about alined axes, a driving-wheel 22, rotated by the motor crank-shaft 23, and a friction transmission-wheel 24, which, as herein shown, is engaged at its cylindric periphery with the inner faces of the disks 21 and is operatively connected with the driving mechanism of the machine of which the transmission mechanism forms a part. The essential function of the driving-wheel 22 is to give rotation to the disks 21 in opposite directions, and to this end the driving connections between the wheel 22 and friction-disks may be of any desired nature. As herein shown, it is a frictional driving connection through opposing beveled faces. The said wheel 24 is provided with a hub 25, which is non-rotatively mounted on a shaft 26, extending rearwardly from and in alinement with the crank-shaft, and the hub is splined to said shaft to permit it to move endwise of the shaft, and thereby shift the transmission-wheel toward and from the centers of the friction-disks 21. The shaft 26 is rotatively mounted at its rear end in a bearing 27, formed in a hanger suspended from the rear cross-bar 17 of the frame. The main portion of said shaft is hollow, and the rear end thereof consists of a separate reduced part 29, that constitutes the rear journal of the shaft, and the forward end of the hollow shaft is provided with a forwardly-opening ball-bearing socket in which is mounted the rear reduced end 30 of the crank-shaft, Fig. 1. The reduced rear end 29 of the shaft is connected by a universal joint 31 with a rearwardly-extending shaft 32, which latter is adapted for connection at its rear end in any suitable manner with the differential gear of the rear axle. (Not shown.)

The friction driving-wheel 22 is mounted on the crank-shaft 23 in a manner permitting it to slide endwise of the shaft and is shown as connected with the fly-wheel 33, mounted non-rotatively on the crank-shaft. The said fly-wheel and driving-wheel are shown as connected by means of studs 34 35, extending through the web-formed inner portions of said wheels radially outside of the hubs thereof. Said studs are fixed to the fly-wheel and have sliding engagement with suitable apertures in the driving-wheel 22, thereby affording an interlocking connection between said wheels, while permitting the friction driving-wheel 22 to move toward and from the friction-disks 21. The said friction driving-wheel 22 is pressed toward the friction-surfaces of the disks 21 by means of spiral expansively-acting springs 36 36, which occupy opposing sockets or recesses formed in the adjacent sides of the opposing wheels. The said studs 34 and 35 and springs 36 are symmetrically disposed in alternate relation about the axis of the wheels 22 and 33, as indicated in Figs. 1, 2, 13, and 14. One of said studs, the stud 35 as herein shown, is screw-threaded at its rear end and provided with a nut which limits the rearward movement of the friction driving-wheel 22 and prevents the driving-wheel from following the friction-disks when the latter are spread or moved away from said driving-wheel. The said screw-threaded stud and nut also provides for adjusting the driving-wheel to the friction-disks 21 in case of wear of the contacting surfaces of said parts. The mechanism illustrated is so constructed that when the interposed shiftable transmission-wheel 24 engages the friction-disks forwardly of their centers the vehicle is driven forwardly while friction contact of the transmission-wheel with the rotative friction-disks rearwardly of their centers operates to drive the vehicle rearwardly.

The means for mounting the friction-disks and moving them into and out of their operative positions are made as follows: Said friction-disks are fixed to the inner ends of outwardly-directed shafts 40 40, which are rotatively mounted in brackets 41 41, one at each side of the machine fixed to and depending from the parallel frame members 16 and 18, Fig. 4. Said brackets 41 are provided at their inner and outer ends with depending lugs 43 44, having alined bearing-apertures to receive the shafts 40, and said shafts are movable endwise in said bearing-lugs to permit the disks to be moved toward and from the friction-wheel 24. Antifriction ball-bearings support the shafts in said bearing-lugs. The antifriction-bearings at the outer end of each shaft consist of a hardened collar 45, fixed to the shaft and balls 46, interposed between said collar and hardened ring 47, fixed in the bearing-lug. Said balls are confined in a suitable annular cage that is held in place between a flange 48 on the inner end of the collar 45 and a flange or washer 49 at the inner end of a nut 50, that has screw-threaded engagement with the outer end of the shaft. Said latter flange or washer closely fits within the bearing-aperture of the outer lug 43, Fig. 5. The ball-bearing at the inner end of each shaft 40 comprises a hardened collar 51, fitted to the shaft and balls 52, interposed between said collar and a hardened ring 53, fitted in the inner bearing-lug, as best shown in Fig. 5, said balls 52 being confined in a suitable annular cage like that which confines the outer bearing-balls 46.

54 designates a spiral spring surrounding each shaft between the bearing-lugs thereof and interposed between collars 55 56, surrounding said shaft 40 and sliding endwise thereon. The inner collar 56 abuts against the outer end of the hardened bearing-collar 51 of the inner ball-bearing, and the inner end of said collar 51 bears against an enlargement or flange 40ª of the shaft which fits closely within the adjacent bearing-ring 53. A suitable cam or equivalent device located between the outer collar 55 and the adjacent bearing-lug 43 of the bracket acts to transmit pressure through said collars 55 56, the interposed spring 54, and the bearing-collar 51 to the enlarged part 40ª of the shaft, and thereby move the shaft and associated disk inwardly to bring the latter into operative engagement with the frictional transmission and driving wheels 24 and 22. The spring 54 is placed under compression between the collars 55 and 56 by means of screw-bolts 57, extending loosely through apertures in lugs or flanges 58 of the collars 55 and have screw-threaded engagement at their other ends with apertures in lugs or flanges 59 of the inner collar 56. The spring is placed under such compression that when the cam is released or in its inoperative position the indirect-drive friction-disks are free from operative engagement with the driving and transmission wheels 22 and 24, so that notwithstanding the rotation of the driving-wheel 22 and the operation of the motor which drives it no power will be transmitted to drive the vehicle through said friction-disks. When the cam is operated to move the disks inwardly, the tension of the spring is such that as soon as the friction-disk 21 is brought into contact with the friction-wheels 22 and 24 the machine will be moved against the least resistance, as when the vehicle (if the device be applied to a vehicle) is passing over a smooth level roadway. This arrangement obviates the necessity of compressing the spring from zero, and thereby brings the machine under prompt control. As the resistance to the movement of the machine is increased, the disks are pressed with proportionably greater force against the friction-wheels 22 and 24 to maintain the parts in proper driving relation. When the pressure of the cams is released, the disks back off from the friction-wheels 22 and 24, thereby cutting off the driving connection between the motor and the machine.

The cam mechanism for shifting the parts inwardly for the purpose set forth is shown in detail in Figs. 5, 6, and 7. Each of said cams consists of a stationary cam member or ring 60, that is fitted within the inner side of the bearing-aperture of the outermost lug 43 around the shaft 40 and is fixed non-rotatively therein by means of a key 61, Fig. 5, and a rocking ring 62, surrounding said shaft, and held against the fixed member by the spring 54. Said fixed and rocking cam-rings are provided on their adjacent faces with spiral clutch-teeth 63, whereby rocking motion of the ring 62 moves the latter inwardly and exerts pressure through the devices described to shift the friction-disk inwardly. As herein shown, the fixed member 60 of the clutch is made of larger internal diameter than the exterior diameter of the shaft, and the rocking member 62 of said clutch is mounted on a sleeve 64, which is fitted tightly in the fixed member clear of the shaft 40 and extends inwardly therefrom to constitute such bearing for the rocking member, Figs. 5 and 8. A thrust-bearing is interposed between the rocking member of the clutch and the adjacent collar 55 consisting of hardened rings 65 66, surrounding the shaft, and interposed spherical rollers 67, which are held in place by means of any familiar form of cage. In order to prevent the outermost thrust-bearing ring 65 from shifting out of place when the rocking cam-ring is moved inwardly, said latter ring is provided at its inner side with a boss or flange 68, upon which the said rocking bearing-ring 65 is mounted. It will be observed that when said cams are brought into action the shafts 40 and all parts carried thereby move inwardly, while the fixed members of the clutches 60 remain stationary with the bearing-brackets, there being sufficient space between the hardened rings 45 of the outer bearings and the fixed members of the cams to permit the required movement to bring the friction-disks properly into action.

In order to provide for driving the vehicle over rough and uneven roads or climbing steep grades, means are provided for transmitting the final pressure of the cams to the disks through solid or continuous connections between the cams and shaft. For this purpose the outer collars 55 are provided at their inner ends with inwardly-extending projections or cylindric flanges 72, that are adapted to be brought up against opposing shoulders 73 on the shafts near the extreme throw of the cams. When the vehicle is traveling over smooth roads, the actuating device for the cams need to be moved only sufficiently to bring but slight pressure of the friction-disks against the driving and transmitting wheels, and when hilly or rough roads are encountered the cams are thrown over the necessary distance of their movement to overcome the resistance, even to the full capacity of the motor, and during the last part of the movement of the cams the pressure exerted thereby is transmitted through the solid connection described. The pressure is released as soon as the severe traction conditions have been passed, so that at all times the pressure exerted upon the frictional driving connections may be in proper proportion to the traction demands.

The mechanism herein shown for rocking the movable members of the cams is made as follows: 80 designates a rock-shaft extending across the vehicle-frame in rear of the friction-disks 21 and mounted at its ends in bearing-brackets 81, depending from the rear transverse member 17 of the frame. 82 is a foot-lever fixed to the rock-shaft 80 near the right hand side of the machine and in front of the driver's seat, which latter is located generally as 83, in Fig. 2. Said rock-shaft is provided at its ends with downwardly-extending rigid arms 84 84, which are connected by links 85 85 with radial arms 86 86 of the rocking cam members. When the foot-lever 82 is depressed or thrown forwardly, therefore, the arms 84 swing rearwardly and act through the links 85 to rock the movable members of the cam in position to force the same and actuated parts inwardly.

Means are provided for locking the clutches in a given position, and thereby maintaining a given pressure on the frictional elements. Said locking means consist, as herein shown, of a ratchet plate or arm 87, Figs. 3, 9, and 10, fixed to and extending forwardly from the rock-shaft 80, and a pivotal pawl 88, engaging the marginal ratchet-teeth. Said pawl is hinged by a pin or bolt 89 to an extension 90 of the bracket 81, in which the shaft 80 is mounted. The pawl is held engaged with the ratchet-teeth by means of a spiral spring 91, interposed between the upper end of the pawl and said bracket.

The friction-disk-actuating cams are restored to their inoperative positions to relieve the pressure of the springs and permit the said cam-disks 21 to move outwardly, when the pawl-and-ratchet mechanism is released in the manner hereinafter described, by means of a spring 92, connected at one end with the adjacent rock-shaft arm 84 and at its other end with the bracket 41. As herein shown, the spring has the form of a combined spring and check. The spring is contained within a cylinder 93, provided at its forward end with a lug 94, that is hinged to the bracket 41, and said casing contains a piston or plunger 96, between which and one end of the cylinder the spring is interposed. A rod 97 extends rearwardly through the spring and through an opening in the rear end of the casing and is pivotally connected, by means of a bolt or pin 98, to the adjacent rock-shaft arm 84. The cylinder 93 is provided at its forward end with a minute opening through which air enters the casing during the time the spring is compressed, and such body of air acts as a cushion during the restoring movement of the spring to avoid sudden shocks and jars coming on the parts.

The pawl-and-ratchet mechanism is herein shown as released to permit the restoration of the parts to their inoperative positions through the action of the brake mechanism. The brake mechanism in said operative connections is made as follows: 100 designates the actuating or foot lever for the brake mechanism. It is pivotally mounted on the shaft 80 laterally outside of the lever 82. The hub 101 of said foot-lever fits loosely on the shaft 80 and is provided with a downwardly-extending arm 102, that is connected at its lower end by means of a link 103 with the lower end of an arm 104, fixed to a rock-shaft 105, extending transversely across the machine-frame. Said rock-shaft 105 is mounted at its ends in bearings formed in brackets 106 106, depending from the side members of the machine-frame, Figs. 1, 2, and 3. Said rock-shaft 105 is provided at its ends outside the machine-frame with upwardly-extending fixed arms 107, Figs. 2 and 3, to the upper ends of which are connected brake-rods 108, extending rearwardly for connection with suitable brake devices. (Not shown.) From this construction it will be obvious that the forward and downward depression of the brake-lever 100 acts to pull the brake-rods 108 forwardly in a manner to set the brake. The means operating with said brake for releasing the pawl-and-ratchet mechanism during the braking movement of the brake-lever before referred to consists, as herein shown, of a roller 110, Figs. 1, 3, 9, and 10, on the brake-lever, that is adapted to engage a roller 111, mounted on the lower end of the pawl in such manner that the first forward movement of the brake-lever acts to release the pawl-and-ratchet mechanism to disconnect the motor from the driving mechanism, and during the further forward movement of said lever the brake is set to arrest the movement of the vehicle.

In lieu of the form of cam described we may employ cams having two rocking members 112 112, Fig. 15, in which event the rock-shaft 80 is provided with oppositely-extending fixed arms 113 113, connected by links 114 114 with the arms 115 115 of said oppositely-rocking cam members. With this construction the swinging movement of the rock-shaft and arms 115 and the movement of the cam members will be but half that of the corresponding parts of the first-described construction.

The mechanism for shifting the transmission friction-wheel 24 toward and from the centers of the disks in a manner to vary the speed or reverse the direction of movement of the vehicle is made as follows: 120 designates a hand-lever located at the right-hand side of the machine and fixed at its lower end to a short rock-shaft 121, mounted in a suitable bearing formed on the lower side of the bracket 106, as shown in Fig. 3. Said rock-shaft is provided with a rearwardly-extending rigid arm 122, which is pivotally connected at its rear end by means of a vertical link 123 with the forwardly and upwardly extending arm 124, Fig. 2, of a rock-shaft 125, that extends transversely across the machine-frame and is mounted in standards 126, fixed to the side members of the frame. Affixed to said rock-shaft near its longitudinal center are downwardly and forwardly extending rigid arms 127 127, Figs. 1 and 2, which are connected at their lower ends by means of links 128 128 to the rear ends of parallel rods or bars 129 129, that are connected at their forward ends to the hub of the friction transmission-wheel 24. Said rods have guiding engagement with laterally-extending arms 130 130, made a part of and extending in opposite directions from the bearing 27 for the supporting-shaft of said friction transmission-wheel. The connection between said rods 129 and the hub of the wheel 24 consists of a split ring 131, surrounding the hub 25 of the wheel and seated in an exterior groove thereon formed between annular antifriction thrust-bearings 132, fixed thereon, as shown in Figs. 1 and 2. Said ring 131 is provided with laterally-extending lugs 133 133, to which the forward ends of the rods 129 are connected. This construction permits the hub of the wheel to turn freely in the said split ring while affording an interlocking connection by which the transmission-wheel may be freely shifted toward and away from the centers of the friction-disks.

Provisions are made for releasing the transmission-wheel from the indirect-drive disks 21 and for connecting the same for direct driving with the driving-wheel 22, thereby driving the vehicle at the maximum speed of the motor. For this purpose the transmission-wheel 24 is provided with a forwardly-directed conical flange 140, and the driving friction-wheel 22 is fashioned to provide an inwardly-facing complemental portion 141, adapted for operative frictional engagement with said conical flange. Said parts are so arranged that when the friction transmission-wheel 24 has been shifted forwardly to impart the maximum speed to the vehicle obtainable through the indirect-drive friction-disks said transmission-wheel is capable of further forward movement against the action of the springs 36 to bring its conical flange into frictional engagement with the inner beveled or conical portion 141 of the driving-wheel 22. When said springs 36 are thus compressed, the driving-wheel 22 is forced forwardly out of contact with the friction-disks. At this time also means are provided for releasing the disks 21 from the transmission-wheel, so that when the direct-drive mechanism is thrown into action the friction-disks 21 are free from movement. As herein shown, such release of the friction-disks is automatically effected when the direct-drive mechanism is brought into action by the following mechanism: The rock-shaft 121 is provided with a short forwardly-directed rigid arm 142, Figs. 1, 2, and 10, which in this case is integral with the hub of arm 122 and is connected by a link 143 with the rear end of a vertically-swinging lever 144, that is pivoted by a pin 145 to a downward and rearward extension 146 of the bracket 81. The forward end of said lever lies adjacent to and is in line with the roller 111 of the locking-pawl 88, before referred to. The parts are so disposed that the instant the transmission-wheel 24 is brought into frictional engagement with the driving-wheel 22 for direct driving, the forward end of said lever 144 bears against the roller 111 of said pawl and throws the pawl out of engagement with the locking-ratchet, whereupon the friction-disks are restored to their normal or inoperative positions.

The hand-lever 120 will in practice be associated with any suitable locking mechanism to hold the transmission-wheel 24 in any position desired, either when engaged with the indirect or direct friction elements. It will be observed that the roller 110 on the brake-lever 100 is located directly over the arm 144, that throws the pawl 88 out of engagement with the ratchet 87 at the time the transmisson-wheel is brought into direct-drive engagement with the drive-wheel 22. Force may therefore be exerted through the brake-lever, the roller 110 thereof, and said lever 144 to the rock-shaft arm 122 for disengaging the transmission-wheel from the direct-drive wheel. With this construction, therefore, such disengagement of the transmission-wheel from the direct-drive wheel may be accomplished through the same movement of the driver or operator of the machine which directs the setting of the brake, it only being necessary to release the hand-lever 120 from its locking device, if such device be provided.

The hanger 150, which supports the bearing 27 for the transmission-wheel shaft and the operating-rods 129 for said wheel is so constructed as to yield in all directions, so as to accommodate itself to any inaccuracy of alinement due to wear, unequal action of the vehicle-springs, or other cause. Said hanger embodies a vertical and horizontal swivel and is made as follows: 151 designates a block which is attached to the under side of the rear cross-bar 17 of the machine by bolts 152ª. Said block is exteriorly cylindric to receive thereover a casting 152, having a cylindric bore, whereby the casting is capable of rotating relatively to the block. Said block is provided at its lower end with a cylindric flange 153, which fits within a complemental annular groove or rabbet in the casting, thereby providing a shoulder on which the casting is rotatively supported. The casting is provided with integral arms 154 154, having apertures at their lower ends which receive a horizontal pin 155, on which is mounted a sleeve 156, forming part of the bearing 27, before referred to. Said sleeve is shown as made of a length less than the distance between the arms of the casting, whereby the sleeve and the bearing carried thereby may shift laterally relatively to the other parts.

The operation of the mechanism may be briefly described as follows: When the vehicle is standing still, the friction-disks 21 21 are in their outermost positions and are inoperative to transmit motion to the driving-wheel 24 and its shaft. When the machine is to be started, the cam mechanisms, through which the disks 21 are forced inwardly, are brought into operation through the medium of the foot-lever 82, whereby movement of said friction-disks 21 is transmitted to the transmission-wheel 24. The speed of said transmission-wheel and the consequent speed of the vehicle is controlled by moving said transmission-wheel 24 a greater or less distance from the centers of the disks, and the direction of movement of the vehicle is reversed by moving said transmission-wheel past the centers of the disks. The said cams are locked into any desired position through the medium of the ratchet 87 and the pawl 88. When the machine is to be stopped, this is effected through the brake-lever 100, which not only sets the brake on the machine, as described, but preparatory to setting the brake acts through the roller 110 to throw the pawl 88 out of engagement with the ratchet, and thereby permit the restoring-spring 97 to return the parts to their normal positions. The said transmission-wheel is shifted toward and from the centers of the friction-disks by means of the lever 120, and said lever 120 serves also to shift the conical part of the transmission-wheel or other analogous part carried by the main shaft of the mechanism into direct driving engagement with the driving-wheel 22, thereby adjusting the machine to its highest speed. Just before the transmission-wheel is brought into direct driving engagement with the driving-wheel the lever 120 acts, through the operatively-connected lever 144, to disengage the pawl 88 from its ratchet, and thereby permit the friction-disks to move outwardly into their inoperative or non-driving positions. By reason of the yielding connection of the driving-wheel 22 with the fly-wheel of the motor when the transmission-wheel is brought into direct-drive engagement with said driving-wheel the driving-wheel is shifted forwardly out of contact with the said transmission-disks, so that said transmission-disks are not rotated during the direct-drive adjustment of the mechanism.

We claim as our invention—

1. In a frictional power-transmission mechanism, a rotative driving-shaft, two opposing, rotative, indirect-drive friction-disks, a wheel on said shaft for driving said disks, a friction transmission-wheel having peripheral engagement with adjacent faces of said disks and movable toward and from the centers thereof, means for transmitting pressure to force the disks into operative frictional contact with said transmission-wheel and springs through which such pressure is transmitted.

2. In a frictional power-transmission mechanism, a rotative driving-shaft, two opposing, rotative, indirect-drive friction-disks, a wheel on said shaft for driving said disks, a friction transmission-wheel having peripheral engagement with adjacent faces of said disks and movable toward and from the centers thereof, means for transmitting pressure to force said disks into operative frictional contact with said transmission-wheel, springs through which such pressure is transmitted and means for placing said springs under compression for the purpose set forth.

3. In a frictional power-transmission mechanism, the combination with two opposing, rotative, indirect-drive friction-disks, means for rotating them, and the interposed transmission-wheel movable toward and from the centers of the disks, of cams for pressing said disks against the interposed transmission-wheel, springs through which the pressure of the cam is transmitted, and means for placing the springs under compression for the purpose set forth.

4. In a frictional power-transmission mechanism, the combination with two opposing, rotative, indirect-drive friction-disks, means for rotating them, and the interposed transmission-wheel movable toward and from the centers of the disks, of cams for pressing said disks against the interposed transmission-wheel, springs through which the pressure of the cam is transmitted, means for placing the springs under compression for the purpose set forth, means for operating the movable members of the cams, and means for locking the cams in various positions of adjustment.

5. In a frictional power-transmission mechanism, the combination with a frame, two opposing, rotative, indirect-drive friction-disks, shafts fixed to and extending outwardly from the disks and having rotary and endwise movement in said frame, means for rotating said disks, and a friction transmission-wheel located between and having peripheral engagement with said disks, and movable toward and from the centers thereof, of spiral springs surrounding said shafts, and cams at the outer ends of said shafts and acting through said springs to yieldingly force the disks against said friction-wheel.

6. In a frictional power-transmission mechanism, the combination with a frame, two opposing, rotative, indirect-drive friction-disks, shafts fixed to and extending outwardly from the disks and having rotary and endwise movement in said frame, means for rotating said disks, a friction transmission-wheel located between and having peripheral engagement with said disks and movable toward and from the centers thereof, of spiral springs surrounding said shafts, cams at the outer ends of said shafts and acting through said springs to yieldingly force the disks against said friction-wheel, and means for compressing said springs in such manner that the action of the cams is applied through the springs to operate the mechanism against the least resistance without further compression of the springs.

7. In a frictional power-transmission mechanism, the combination with the frame, two opposing, rotary, indirect-drive friction-disks provided with outwardly-extending bearing-shafts which are mounted in said frame to rotate and also move endwise therein, means for driving said disks and a friction transmission-wheel having peripheral engagement with, and movable toward and from the centers of, said disks, of cams at the outer ends of said shafts and acting on said shafts to move the friction-disks into operative frictional engagement with the transmission-wheel, springs surrounding said shafts between said cams and disks through which the pressures of the cams is transmitted to force the disks into operative engagement with said frictional wheel, and means for operating said cams comprising a rock-shaft extending across the machine-frame in rear of the disks, a lever fixed to the shaft for rocking the same, and arms fixed to the opposite ends of said shaft and operatively connected with the movable members of the cams.

8. In a frictional power-transmission mechanism, the combination with the frame, the friction-disks and the driving and transmission wheels, of shafts fixed to and extending outwardly from said disks, bearing-brackets supported on the frame in which said shafts are mounted to rotate and move endwise, spiral springs surrounding said shaft and normally exerting no pressure on the disks, and cams at the outer ends of said shafts acting through said springs for yieldingly transmitting pressure to the disks to bring the latter into operative engagement with the driving and transmission wheels.

9. In a frictional power-transmission mechanism, the combination with the frame, the friction-disks and the driving and transmission wheels, of shafts fixed to and extending outwardly from said disks, bearing-brackets supported on the frame in which said shafts are mounted to rotate and move endwise, spiral springs surrounding said shaft and normally exerting no pressure on the disks, and cams at the outer ends of said shafts acting through said springs for yieldingly transmitting pressure to the disks to bring the latter into operative engagement with the driving and transmission wheels, and means for maintaining the said springs under compression for the purpose set forth.

10. In a frictional power-transmission mechanism, the combination with the frame, the friction-disks and the driving and transmission wheels, of shafts fixed to and extending outwardly from said disks, bearing-brackets supported on the frame in which said shafts are mounted to rotate and move endwise, spiral springs surrounding said shaft and normally exerting no pressure on the disks, cams at the outer ends of said shafts acting through said springs for yieldingly transmitting pressure to the disks to bring the latter into operative engagement with the driving and transmission wheels, means for locking said cams in operative positions, and means for simultaneously releasing said cams.

11. In a frictional power-transmission mechanism, the combination with the frame, the opposing, rotary, indirect-drive friction-disks, and the driving and transmission wheels coöperating therewith, of shafts extending outwardly from said friction-disks, brackets supported on the frame in which said shafts are rotatively and endwise movably mounted, two sliding collars on each shaft, a spring interposed between each pair of collars, and cams interposed between the outermost collars and brackets, and acting through said collars and spring to yieldingly force the friction-disks into operative engagement with said driving and transmission wheels.

12. In a frictional power-transmission mechanism, the combination with the frame, the opposing, rotary, indirect-drive friction-disks, and the driving and transmission wheels coöperating therewith, of shafts extending outwardly from said friction-disks, brackets supported on the frame in which said shafts are rotatively and endwise movably mounted, two sliding collars on each shaft, a spring interposed between each pair of collars, cams interposed between the outermost collars and brackets, and acting through said collars and spring to yieldingly force the friction-disks into operative engagement with said driving and transmission wheels, and means for compressing said spring between said collars.

13. In a frictional power-transmission mechanism, the combination with the frame, the opposing, rotative, indirect-drive friction-disks, and the driving and transmission wheels coöperating therewith, of shafts extending outwardly from said friction-disks, brackets supported on the frame in which said shafts are mounted to rotate and slide endwise, each shaft being provided with two sliding collars, the inner one of which abuts against a solid portion of the shaft, a spring interposed between said collars, cams interposed between the outermost collars and brackets and acting through said collars and spring to transmit the force of the cams to the shafts to move the disks into operative position, and clamping-bolts extending through apertures in one of said collars and having screw-threaded engagement with apertures in the other collar for compressing said spring.

14. In a frictional power-transmission mechanism, the combination with the frame, the opposing, rotary, indirect-drive friction-disks, and the driving and transmission wheels coöperating therewith, of shafts extending outwardly from said friction-disks, brackets supported on the frame in which said shafts are rotatively and endwise-movably mounted, two sliding collars on each shaft, a spring interposed between each pair of collars, and cams interposed between the outermost collars and brackets, and acting through said collars and spring to yieldingly force the friction-disks into operative engagement with said driving and transmission wheels, and means constructed to transmit the force of the cams, during their innermost movement thereof, to the disk through a solid connection.

15. In a frictional power-transmission mechanism, the combination with the frame, the opposing, rotative, indirect-drive friction-disks, and the driving and transmission wheels coöperating therewith, of shafts extending outwardly from said friction-disks, brackets supported on the frame in which said shafts are mounted to rotate and slide endwise, each shaft being provided with two sliding collars, the inner one of which abuts against a solid portion of the shaft, a spring interposed between said collars, cams interposed between the outermost collars and brackets and acting through said collars and spring to transmit the force of the cams to the shafts to move the disks into operative position, and an outwardly-facing shoulder on each shaft against which the outer collar is brought by the action of the cam, thereby affording a solid connection through which the force of the cam is transmitted to its friction-disk.

16. In a frictional power-transmission mechanism, the combination with the frame, the opposing, rotary, indirect-drive friction-disks, and the driving and transmission disks coöperating therewith, of shafts extending outwardly from said friction-disks which are mounted to rotate and move endwise in said frame, each shaft being provided with two sliding collars the inner one of which bears against a shoulder on the shaft, a spring interposed between said collars, cams interposed between the outermost collars and the shaft-bearings and operating through said collars and springs to yieldingly force the disks into operative engagement with the driving and transmission wheels and antifriction thrust-bearings interposed between said cams and the outermost collars.

17. In a frictional power-transmission mechanism, the combination with the frame, the opposing, rotary, indirect-drive friction-disks, and the driving and transmission disks coöperating therewith, of shafts extending outwardly from said friction-disks which are mounted to rotate and move endwise in said frame, each shaft being provided with two sliding collars the inner end of which bears against a shoulder on the shaft, a spring interposed between said collars, cams interposed between the outermost collars and the shaft-bearings and operating through said collars and springs to yieldingly force the disks into operative engagement with the driving and transmission wheels, antifriction-bearings between the inner and outer ends of each shaft and said frame.

18. In a power-transmission mechanism, a transmission-wheel through which power is transmitted to the part to be driven, frictional indirect-drive elements for driving the transmission-wheel at varying speeds, a brake mechanism and means controlled by the brake mechanism for separating the indirect-drive elements from the transmission-wheel.

19. In a frictional power-transmission mechanism, the combination with the frame, two opposing, rotative, indirect-drive friction-disks and the driving and friction transmission wheels coöperating therewith, of means for forcing said friction-disks into operative engagement with said transmission-wheel, braking mechanism and means for automatically releasing said disks when the braking mechanism is set in operation.

20. In a frictional power-transmission mechanism, the combination with the frame, two opposing, rotative, indirect-drive friction-disks and the driving and friction transmission wheels coöperating therewith, of cams for forcing said friction-disks into operative engagement with said transmission-wheel, means for locking the cams, a braking mechanism, and means operated by the braking mechanism for releasing the cam-locking means.

21. In a frictional power-transmission mechanism, the combination with the frame, two opposing, rotative, indirect-drive friction-disks, and the driving and friction transmission wheels coöperating therewith, of cams for forcing said disks into operative contact with said transmission-wheel, a ratchet-and-pawl mechanism for locking said cams, and a braking mechanism embracing a part which moves the pawl out of engagement with the rack to release said cams when the braking mechanism is brought into action.

22. In a frictional power-transmission mechanism, the combination with the frame, two opposing, rotative, indirect-drive friction-disks, and driving and friction transmission wheels coöperating therewith, of cams operating to force said disks inwardly against the interposed transmission-wheel, means for operating said cams comprising a rock-shaft extending across and having bearing in the machine-frame, an operating-lever fixed to said rock-shaft, operative connections between said rock-shaft and the movable members of the cams, means for locking said rock-shaft in varying angular positions, a braking mechanism, and means for automatically operating to release said rock-shaft-locking mechanism when the braking mechanism is brought into operation.

23. In a frictional power-transmission mechanism, the combination with the frame, two opposing, rotative, indirect-drive friction-disks, and driving and transmission wheels coöperating therewith, of cams to force said disks inwardly toward said driving and transmission wheels, means for operating said cams comprising a rock-shaft extending across and having bearing in the machine-frame, an operating-lever fixed to said rock-shaft, operative connections between the ends of said rock-shaft and the movable members of the cams, a ratchet carried by said rock-shaft, a pawl carried by the frame engaging said ratchet, a brake-lever mounted on said rock-shaft and adapted for operative connection with the braking mechanism, and a part on said brake-lever adapted to release the pawl from said ratchet when the brake-lever is thrown into action.

24. In a frictional power-transmission mechanism, the combination with the frame, two opposing, rotative, indirect-drive friction-disks, and driving and transmission wheels coöperating therewith, of shafts extending outwardly from said disks and rotatively mounted in said frame and sliding endwise in their bearings, cams at the outer ends of said shafts for moving the shafts inwardly and acting therethrough to force the disks toward said driving and transmission wheels, and means for operating said cams comprising a rock-shaft extending across and mounted in the frame, rigid arms at the ends of said shafts operatively connected with the movable members of the said cams, an operating-lever fixed to said rock-shaft, means for locking the rock-shaft, and a spring for restoring the rock-shaft and cams to their inoperative position when said locking means are released.

25. In a frictional power-transmission mechanism, the combination with the frame, two opposing, rotative, indirect-drive friction-disks, and driving and transmission wheels coöperating therewith, of shafts extending outwardly from said disks and rotatively mounted in said frame and sliding endwise in their bearings, cams at the outer ends of said shafts for moving the shafts inwardly and acting therethrough to force the disks toward said driving and transmission wheels, and means for operating said cams comprising a rock-shaft extending across and mounted in the frame, rigid arms at the ends of said shafts operatively connected with the movable members of the said cams, an operating-lever fixed to said rock-shaft, means for locking the rock-shaft, and a combined restoring-spring and air-check device for returning the rock-shaft and the cams to their inoperative position when the locking device is released.

26. In a power-transmission mechanism, a transmission-wheel through which power is transmitted to the part to be driven, direct and indirect drive friction elements, means for engaging the transmission-wheel with either of said friction elements, a brake mechanism and means controlled by the brake mechanism for disengaging the transmission-wheel from the direct-drive mechanism.

27. In a frictional power-transmission mechanism, the combination with two rotative, indirect-drive friction-disks, a driving-wheel, a spring for holding the driving-wheel against said disks for rotating the same, and a friction transmission-wheel interposed between and driven by said disks and movable toward and from the centers thereof, of means whereby said transmission-wheel is engaged with the driving-wheel for direct drive and operating to force the driving-wheel out of engagement with the disks against the action of said spring.

28. In a frictional power-transmission mechanism, the combination with two rotative, indirect-drive friction-disks, a driving-wheel spring-pressed against the disks for rotating the same, and a friction transmission-wheel interposed between and driven by said disks and movable toward and from the centers thereof, of a friction device movable with the transmission-wheel adapted to engage a friction-surface on the driving-wheel for direct drive.

29. In a frictional power-transmission mechanism, the combination with two opposing, rotative, indirect-drive friction-disks, and the driving and transmission wheels coöperating therewith, the latter movable toward and from the centers of the friction-disk, of means for pressing said disks toward said driving and transmission wheels, means for locking said disks engaged with said driving and transmission wheels, means whereby the transmission-wheel is engaged with the driving-wheel for direct drive, and means operating to automatically release the friction-disks from said driving and transmission wheels when said direct-drive connection is effected.

30. In a frictional power-transmission mechanism, the combination with two opposing, rotative, indirect-drive friction-disks, and the driving and transmission wheels coöperating therewith, the latter being movable toward and from the centers of said disks, of a shaft on which said transmission-wheel is mounted, the hub of said wheel being splined to the shaft, means for moving said wheel toward and from the center of the disk, comprising a rock-shaft, a hand-lever operatively connected with said rock-shaft, operative connections between said rock-shaft and the hub of said transmission-wheel, constructed to force the transmission-wheel into frictional engagement with the driving-wheel for direct-drive connections, means for pressing said friction-disks into operative engagement with the driving and transmission wheels, means for locking said disks in their operative positions, and means controlled by said hand-lever for releasing the said locking means when said transmission-wheel is brought into direct driving engagement with the driving-wheel.

31. In a frictional power-transmission mechanism, the combination with two opposing, rotative, indirect-drive friction-disks, and the driving and transmission wheels coöperating therewith, the latter being movable toward and from the centers of the friction-disks, and adapted to be moved into driving engagement with the driving-wheel, means for forcing said friction-disks into operative engagement with said driving and transmission wheels, means for locking said friction-disks in their operative positions, embracing a pawl-and-ratchet mechanism, mechanism for moving said transmission-wheel toward and from the centers of the disks, and constructed to finally bring the same into direct driving engagement with the driving-wheel, said mechanism embodying means for releasing the pawl from said ratchet at the time the transmission-wheel is brought into operative engagement with the driving-wheel.

32. In a frictional power-transmission mechanism, the combination with two opposing, rotative, indirect-drive friction-disks, and the driving and transmission wheels cooperating therewith, said transmission-wheel being movable toward and from the centers of the friction-disks, and being adapted to be moved into driving engagement with the driving-wheel, means for locking said friction-disks pressed against said driving and transmission wheels, embracing a pawl-and-ratchet mechanism, mechanism for moving the transmission-wheel toward and from the centers of the disks comprising a rock-shaft located in rear of the disks and operatively connected with the hub of said transmission-wheel, a hand-lever for rocking said shaft, an arm swinging in unison with the hand-lever, and a lever mounted in the machine-frame and connected at one end with the said arm, and adapted to engage at its other end the pawl to swing it out of engagement with its ratchet.

33. In a frictional power-transmission mechanism, the combination with two opposing, rotative, indirect-drive friction-disks, and the driving and transmission wheels cooperating therewith, said transmission-wheel being movable toward and from the centers of the friction-disks, and being adapted to be moved into driving engagement with the driving-wheel, of means for forcing said friction-disks into operative engagement with said driving and transmission wheels, means for locking said friction-disks in their operative positions, embracing a pawl-and-ratchet mechanism, mechanism for moving said friction-wheel toward and from the centers of the disks, and for finally moving the same into direct driving engagement with the driving-wheel, comprising a short rock-shaft, a hand-lever fixed thereto, a second rock-shaft mounted in the frame in rear of the disks, operative connections between the hand-lever rock-shaft and the second rock-shaft, operative connections between said latter rock-shaft and the transmission-wheel, an arm extending forwardly from said hand-lever rock-shaft, and a vertically-swinging lever connected at its rear end with said latter arm and extending at its forward end in position to engage the pawl to release it from said ratchet.

34. In a frictional power-transmission mechanism, the combination with two opposing, rotative, indirect-drive friction-disks, and the driving and transmission wheels, the latter being movable toward and from the centers of the driving-disks, a driving-shaft, a part carried by said driving-shaft, between which and said driving-wheel is interposed springs which hold the driving-wheel in engagement with the friction-disks, means for forcing the friction-disks into operative engagement with said driving and transmission wheels, said transmission-wheel being movable into frictional engagement with the driving-wheel for direct drive and said springs permitting the driving-wheel to yield from the said friction-disks when the transmission-wheel is thus engaged with the same.

35. In a frictional power-transmission mechanism, the combination with two opposing, rotative, indirect-drive friction-disks, and the driving and transmission wheels, the latter being movable toward and from the centers of the driving-disks, a driving-shaft, a part carried by said driving-shaft between which and said driving-wheel is interposed springs which hold the driving-wheel in engagement with the friction-disks, means for forcing the friction-disks into operative engagement with said driving and transmission wheels, and means for locking said friction-disks in their operative positions, said transmission-wheel being movable into frictional engagement with the driving-wheel for direct drive, and said springs permitting the driving-wheel to yield from the said friction-disks when the transmission-wheel is thus engaged with the same.

36. In a frictional power-transmission mechanism, the combination with two opposing, rotative, indirect-drive friction-disks, and the driving and transmission wheels, the latter being movable toward and from the centers of the driving-disks, a driving-shaft, a part carried by said driving-shaft, between which and said driving-wheel is interposed springs which hold the driving-wheel in engagement with the friction-disks, means for forcing the friction-disks into operative engagement with said driving and transmission wheels, and means for locking said friction-disks in their operative positions, said transmission-wheel being movable into frictional engagement with the driving-wheel for direct engagement with the driving-wheel for direct drive, and said springs permitting the driving-wheel to yield from the said friction-disks when the transmission-wheel is thus engaged with the same, and means acting when the direct drive is effected, for automatically releasing the friction-disks from said transmission-wheel.

37. In a frictional power-transmission mechanism, the combination with a driving-shaft, two rotative friction-disks, one on each side of the said shaft, a wheel rotating with the driving-shaft and movable endwise thereof for driving said disks, a shaft in alinement with the driving-shaft, a transmission-wheel splined to the said latter shaft and movable toward and from the center of the disks, means for forcing said friction-disks in operative engagement with the driving and transmission wheels, springs for pressing the driving-wheel toward the friction-disks, and an adjustable stop for limiting the movement of said driving-wheel toward said disks.

38. In a frictional power-transmission mechanism, the combination with the driving-shaft, two opposing, rotative, indirect-drive friction-disks, a driving-wheel mounted on the driving-shaft and movable endwise thereof for driving said disks, a second wheel fixed to said shaft, studs extending rearwardly from the second wheel and having sliding engagement with apertures in said driving-wheel, springs interposed between said driving-wheel and fixed wheel of the driving-shaft for pressing the driving-wheel toward the friction-disks, one of said studs being provided with an adjustable stop to limit the movement of said driving-wheel toward said friction-disks, a friction transmission-wheel interposed between and driven by said indirect-drive disks, and means for forcing said transmission-wheel toward and from the centers of said disks.

39. In a frictional power-transmission mechanism, the combination with two opposing, rotative, indirect-drive friction-disks, a driving-wheel for rotating the same and a friction transmission-wheel interposed between and driven by said disks, of means whereby said transmission-wheel is engaged with the driving-wheel for direct drive, a brake mechanism and means operated by the brake mechanism, when the latter is brought into action, for disengaging the transmission-wheel from the driving-wheel.

40. In a frictional power-transmission mechanism, the combination with two opposing, rotative, indirect-drive friction-disks, a driving-wheel for rotating the same and a friction transmission-wheel interposed between and driven by said disks, of means whereby said transmission-wheel is engaged with the driving-wheel for direct drive, means operating when the direct-drive connection is effected for releasing the indirect-drive disks from the transmission-wheel, a brake mechanism and means operated by the brake mechanism, when the latter is brought into action for disengaging the transmission-wheel from the driving-wheel.

41. In a frictional power-transmission mechanism, the combination with the frame, a driving-shaft, two opposing, rotative, indirect-drive friction-disks, a driving-wheel rotated by said driving-shaft for rotating said disks, a shaft extending in alinement with said driving-shaft, a friction transmission-wheel splined to said shaft whereby it is movable toward and from the centers of the disks, a bearing for the rear end of said latter shaft, a combined rotative and swinging hanger for supporting said bearing from said frame.

42. In a frictional power-transmission mechanism, the combination with the frame, a driving-shaft, two opposing, rotative, indirect-drive friction-disks, a driving-wheel rotated by said driving-shaft for rotating said disks, a shaft extending in alinement with said driving-shaft, a friction transmission-wheel splined to said shaft whereby it is movable toward and from the centers of the disks, a bearing for the rear end of said latter shaft, and a hanger for supporting said bearing from the frame comprising a part rotative on a vertical axis provided with downwardly-extending arms, a horizontal pin extending between and fixed in said arms, and a sleeve fixed to said bearing and mounted on said pin.

43. In a frictional power-transmission mechanism, the combination with the frame, a driving-shaft, two opposing, rotative, indirect-drive friction-disks, a driving-wheel rotated by said driving-shaft for rotating said disks, a shaft extending in alinement with said driving-shaft, a friction transmission-wheel splined to said shaft whereby it is movable toward and from the centers of the disks, a bearing for the rear end of said latter shaft, and a hanger for supporting said bearing from the frame comprising a part rotative on a vertical axis provided with downwardly-extending arms, a horizontal pin extending between and fixed in said arms, and a sleeve fixed to said bearing and mounted on said pin, said sleeve being shorter than the distance between said hanger-arms, whereby it is capable of lateral movement on said pin.

44. In a frictional power-transmission mechanism, the combination with the frame, the driving-shaft, of two opposing, rotative, indirect-drive friction-disks, a driving-wheel rotated by said shaft for driving said disks, a shaft between said disks extending in alinement with said driving-shaft, a friction transmission-wheel driven by said disks, and splined to said shaft, whereby it is movable toward and from the centers of the disks, a bearing for the rear end of said latter shaft, a hanger for supporting said bearing from the frame comprising a part rotative about a vertical axis and provided with downwardly-extending arms, a horizontal pin extending between said arms, and a sleeve fixed to said bearing and mounted on said sleeve, parallel rods connected at their forward ends to the hub of said wheel, oppositely-directed guide-arms carried by said shaft-bearing and provided with guide-apertures through which said rods extend, and means operatively connected with the rear ends of said rods for moving the same endwise and thereby move the transmission-wheel toward and from the centers of the friction-disks.

45. In a frictional power-transmission mechanism, the combination with the indirect-drive friction-disk, and the friction-wheel bearing against the same, of means for thrusting said disk toward said friction-wheel, a spring through which said thrust is transmitted, and means for placing said spring under compression for the purpose set forth.

46. In a frictional power-transmission mechanism, the combination with the indirect-drive friction-disk, and the friction-wheel bearing against the same, of means for thrusting said disk toward said friction-wheel, a spring through which said thrust is transmitted, and means whereby the final thrust is transmitted through a solid connection.

47. In a frictional power-transmission mechanism, the combination with the motor-shaft, a main shaft in alinement therewith, an indirect-drive friction-disk having its axis disposed at right angles to the axes of the motor and main shafts, a driving-wheel on the motor-shaft, springs pressing said driving-wheel against said disk, a transmission-wheel on the main shaft having peripheral engagement with said disk, means for pressing said disk against the transmission-wheel, a part carried by said main shaft having a friction-surface adapted to be forced into engagement with a complemental surface of the driving-wheel for direct drive, and acting to force said driving-wheel, against the action of its spring, out of engagement with said disk.

In testimony that we claim the foregoing as our invention we affix our signatures, in presence of two witnesses, this 23d day of October, A. D. 1905.

IVERT LARSEN.
ROBERT HARDIE.

Witnesses:
W. L. HALL,
I. R. NILKINS.